United States Patent Office 2,910,519
Patented Oct. 27, 1959

2,910,519

METHOD FOR PRODUCING ISOTOPIC METHANES FROM LITHIUM CARBONATE AND LITHIUM HYDRIDE

Jack W. Frazer, Livermore, Calif., assignor to the United States of America as represented by the United States Atomic Energy Commission No Drawing. Application March 24, 1958
Serial No. 723,616

12 Claims. (Cl. 260—676)

This invention relates to a process for producing methane and, more specifically, to such a process employing a solid phase reaction between lithium hydride and lithium carbonate. Since isotopes of hydrogen and carbon can be easily incorporated into either one or both of the two reactants, the process is amenable to the production of isotopic methane, i.e., methane containing isotopes of hydrogen and/or carbon.

Methane is a ubiquitous material which is produced and consumed in countless industrial operations and enters into a multitude of biological and chemical reactions. Chemically pure methane is difficult to prepare. Furthermore, isotopes of hydrogen and carbon cannot be introduced easily into methane itself and processes for production of isotopic methanes from other materials generally involve purification difficulties. For example, deuterated water is commonly reacted with aluminum carbide to produce deuterated methanes with the consequent difficulty in separating the water, methane and gaseous reaction by-products.

A method of producing methane and isotopic derivatives thereof has now been discovered wherein an admixture of solid reactants is heated to yield a simple gaseous reaction mixture from which chemically pure methane can be separated by simple procedures. More particularly, finely divided lithium hydride and lithium carbonate are mixed in intimate contact and the mixture is heated, whereupon a solid phase reaction occurs in which methane is evolved with some hydrogen. The methane may be collected and separated from the concurrently evolved hydrogen by condensation or other conventional procedures.

Accordingly, an object of the invention is to provide a method for the production of methane.

A further object of the invention is to provide a process for the production of methane from solid constituents.

Another object of the invention is to provide a process for the production of methane with little or no gaseous impurities.

Another object of the invention is to provide a process for the production of isotopic methanes, i.e., $CH_4$ in which the carbon component may be any isotope or isotopic mixture of carbon and the hydrogen component may be protonic hydrogen, deuterium, tritium or a mixture thereof.

Another object of the invention is to provide a method for the production of isotopic methanes by reacting lithium hydride with lithium carbonate.

The invention will be better understood by consideration of the following description and example.

In operating the process of the invention apparatus including a closed reaction chamber equipped with high temperature heating means and a gas collection system is employed. Ordinarily the chamber and conduits and reservoirs of the gas collection system are evacuated to eliminate air or the air may be displaced by an inert gas or hydrogen gas of similar isotopic composition to that of the lithium hydride employed.

The reactants, lithium carbonate and lithium hydride, may be prepared by a number of well-known processes and natural isotopic mixtures are available through regular commercial channels. If isotopic methane is to be prepared lithium carbonate in which the carbon component is enriched in $C^{12}$, $C^{13}$ or $C^{14}$ and/or lithium hydride in which the hydrogen component is protonic hydrogen, deuterium, tritium or any desired mixture thereof is employed. The materials are employed in a finely divided dry powder form. Impurities ordinarily found in these materials, i.e., lithium hydroxide, oxide, nitrate, etc., and lithium metal, have surprisingly little effect upon the reaction; however, elimination from source materials removes the necessity of separation of various impurities from the reaction products. The finely divided carbonate and lithium hydride of selected isotopic composition are admixed in a stoichiometric 70% $Li_2CO_3$—30% LiH ratio, yielding a uniform, intimate mixture. Mesh size is not critical, and with mesh size mixtures of —20 to —300 the reaction proceeds smoothly. However, extremely small particle size, e.g., —325 mesh, tends to promote reaction rates greater than can conveniently be handled with a solid bed and should be avoided. Comminution and mixing is done in vacuum or under dry inert atmosphere because of the affinity of the hydride for water. Where a tritium isotope, i.e., lithium tritide, is to be employed suitable precautions and procedures for radioactive materials must be followed. For easy handling and to eliminate dust dispersion during the reaction the mixture is molded into small pellets or wafers with pressures of at least 5,000 and up to 60,000 p.s.i.

The pelleted admixture is placed in the closed vessel having the gas collection system connected thereto and the vessel is evacuated to remove gaseous impurities and air. Heat is applied to the admixture whereupon evolution of methane generally commences as the temperature approaches 350–400° C. The temperature is held at a point at which methane continues to be evolved, i.e., about 400° C., at an acceptable rate. The exact mechanism of the reaction has not been determined, but the hydride appears to diffuse into the carbonate rather than fuse therewith. The reaction is endothermic and the rate of gas production increases rapidly as the temperature is raised. Temperature control is therefore essential to prevent disruption of the pellets. Hydrogen, as well as methane, is evolved in the reaction together with small amounts of $CO_2$. Separation, where necessary, may be easily accomplished by condensation of the methane in a liquid nitrogen cold trap of large surface area and pumping off of the hydrogen or the condensed methane may be withdrawn as a liquid. At the conclusion of the process the solid reactants appear visibly discolored, but not appreciably fused together. Yields of >10%, based on complete combination of the hydrogen atoms, are obtained within the first hour, and somewhat larger yields may be obtained when application of heat is continued for a longer period. The residual hydrogen can of course be reconverted into lithium hydride and recycled.

Further details of the process will become apparent upon consideration of the following example.

*Example*

About 0.95 gram of lithium carbonate and 0.40 gram of lithium hydride were intimately mixed in a glove box under an inert atmosphere. The lithium carbonate was a commercial grade of under 100 mesh and substantially pure. The lithium deuteride was below about —40 mesh with 13 wt. percent being fine enough to pass through a −325 mesh sieve. Purity was about 95%, with impurities consisting of the hydroxide and the oxide, produced from reactions which occur upon contact with air, and of trace amounts of lithium carbonate, lithium nitride and free lithium metal. The admixture was molded into a small wafer by application of 5,000 p.s.i. in a conventional hand press and the wafer was placed in an iron crucible which was then inserted into a 1½ in. dia. Pyrex tube connected to a vacuum system. After evacuation to about $10^{-3}$ mm. Hg, the iron crucible was heated by an exterior induction furnace to a temperature between 350 and 400° C., at which point the reaction began and continued. Gas evolved was pumped through a Toepler pump and collected in a gas burette, from whence it could be withdrawn into a vacuum bottle for analysis. About 190 ml. of gas were collected in the first hour and a total of 360 ml. was collected in the 6½ hours during which heating was continued. Spectroanalysis of the gas sample showed 12.6% $CH_4$ and 85.7% $H_2$. 0.53% carbon dioxide was detected. No analysis was made of the resultant solid materials.

While the invention has been disclosed with respect to several preferred embodiments, it will be apparent to those skilled in the art that numerous variations and modifications may be made within the spirit and scope of the invention and thus it is not intended to limit the invention except as defined in the following claims.

What is claimed is:

1. In a process for producing methane, the steps comprising reacting lithium carbonate with lithium hydride.

2. In a process for producing isotopic methane, the steps comprising intimately contacting finely divided lithium carbonate and lithium hydride, the carbon isotope in said lithium carbonate being selected from the group consisting of $C^{12}$, $C^{13}$, $C^{14}$ and mixtures thereof, and the hydrogen isotope in said lithium hydride being selected from the group consisting of protonic hydrogen, deuterium and tritium, and mixtures thereof, and thereafter heating said admixture.

3. The process of claim 2 in which said carbon isotope consists of a mixture of carbon-12 and carbon-13.

4. The process of claim 2 in which said carbon isotope consists of carbon-14.

5. The process of claim 2 in which said hydrogen isotope consists of protonic hydrogen.

6. The process of claim 2 in which said hydrogen isotope consists of deuterium.

7. The process of claim 2 in which said hydrogen consists of tritium.

8. In a process for producing isotopic methane, the steps comprising intimately contacting finely divided lithium carbonate and lithium hydride, disposing said admixture in a container connected to a gas collecting apparatus, evacuating said container, heating said admixture to a temperature in the range of 350° to 400° C. to produce a gaseous mixture of said methane and impurities, collecting the gaseous mixture, and separating the methane from the impurities in said mixture.

9. The process of claim 8 in which said finely divided lithium hydride and lithium carbonate have a mesh size in the range of 20–325.

10. The process of claim 8 in which said mixture of lithium carbonate and lithium hydride are in a pelleted form.

11. The process of claim 8 in which the methane is separated from said gaseous mixture by condensation.

12. In a process for producing an isotopic methane, the steps comprising intimately mixing and contacting lithium carbonate and lithium hydride particles smaller than 20 mesh, the carbon isotope of said lithium carbonate being selected from the group consisting of $C^{12}$, $C^{13}$ and $C^{14}$, and mixtures thereof, and the hydrogen isotope in said lithium hydride being selected from the group consisting of protonic hydrogen, deuterium, tritium and mixtures thereof, molding said materials with pressures of from 5,000 to 60,000 p.s.i. to form a compact, disposing said compact in a container connected to a gas collecting apparatus, evacuating said container, heating said admixture to a temperature in the range of 350 to 400° C. to yield gaseous mixture containing the methane along with gaseous impurities, collecting said mixture, and separating isotopic methane from said impurities by condensation.

References Cited in the file of this patent

Meyer et al.: Chem. Abstracts, 3:64$^9$–65$^1$, 1909.